United States Patent [19]

Mashuda

[11] Patent Number: 4,715,570

[45] Date of Patent: Dec. 29, 1987

[54] FOLDABLE DRAIN HOSE SUPPORT

[76] Inventor: David Mashuda, 130 Wisconsin Ave., Evans City, Pa. 16033

[21] Appl. No.: 882,306

[22] Filed: Jul. 7, 1986

[51] Int. Cl.$^4$ .............................................. F16L 3/00
[52] U.S. Cl. ...................................... 248/49; 248/83; 248/166; 138/106
[58] Field of Search ...................... 248/49, 58, 75, 80, 248/83, 85, 150, 371, 166, 170, 284; 138/106, 108; 182/163

[56] References Cited

U.S. PATENT DOCUMENTS

| | | | |
|---|---|---|---|
| 1,326,650 | 12/1919 | Doerr | 248/284 |
| 2,319,745 | 5/1943 | Napoli | 248/284 |
| 3,169,741 | 2/1965 | Bittner | 248/49 |
| 3,572,622 | 3/1971 | Smith | 248/49 |
| 3,730,228 | 5/1973 | Gibbs | 248/49 |
| 3,809,348 | 5/1974 | DiLaura | 248/49 |
| 3,819,137 | 6/1974 | Smith | 248/49 |
| 4,082,242 | 4/1978 | Smith | 248/49 |
| 4,102,523 | 7/1978 | Finnell | 248/49 |
| 4,125,237 | 11/1978 | Hagins | 248/49 |
| 4,169,571 | 10/1979 | Duggan | 248/49 |
| 4,194,711 | 3/1980 | Winton | 248/49 |
| 4,228,978 | 10/1980 | Rand | 248/49 |

FOREIGN PATENT DOCUMENTS

| | | | |
|---|---|---|---|
| 488514 | 12/1953 | Italy | 182/163 |
| 735542 | 5/1980 | U.S.S.R. | 248/166 |

Primary Examiner—J. Franklin Foss
Assistant Examiner—Robert A. Olson
Attorney, Agent, or Firm—Buell, Ziesenheim, Beck & Alstadt

[57] ABSTRACT

A foldable trestle for supporting a flexible drain conduit is formed of four or more stretcher sections connected end-to-end by hinge sections. The stretcher sections each comprise a pair of angle members with upright flanges spaced apart at each end by a crosswise hinge member. The hinge member connecting the first and second stretcher sections is a single-pin hinge; the hinge members connecting the second and third sections and the remaining hinge members are double-pin hinges. For storage the first and second sections are folded back-to-back around the pin of their hinge. The spacing between pins of the second hinge is sufficient to permit the third stretcher section to be folded parallel to the second stretcher section but spaced therefrom so as to enclose the folded first stretcher section. The spacing between pins of the third hinge is sufficient to permit the fourth stretcher section to be folded parallel to the third stretcher section but spaced therefrom so as to envelope the folded together first and second stretcher sections, and so on. U-shaped ground support members are pivotally mounted at their open ends to the first and last stretcher sections respectively so as to fold into alignment with those sections respectively.

5 Claims, 4 Drawing Figures

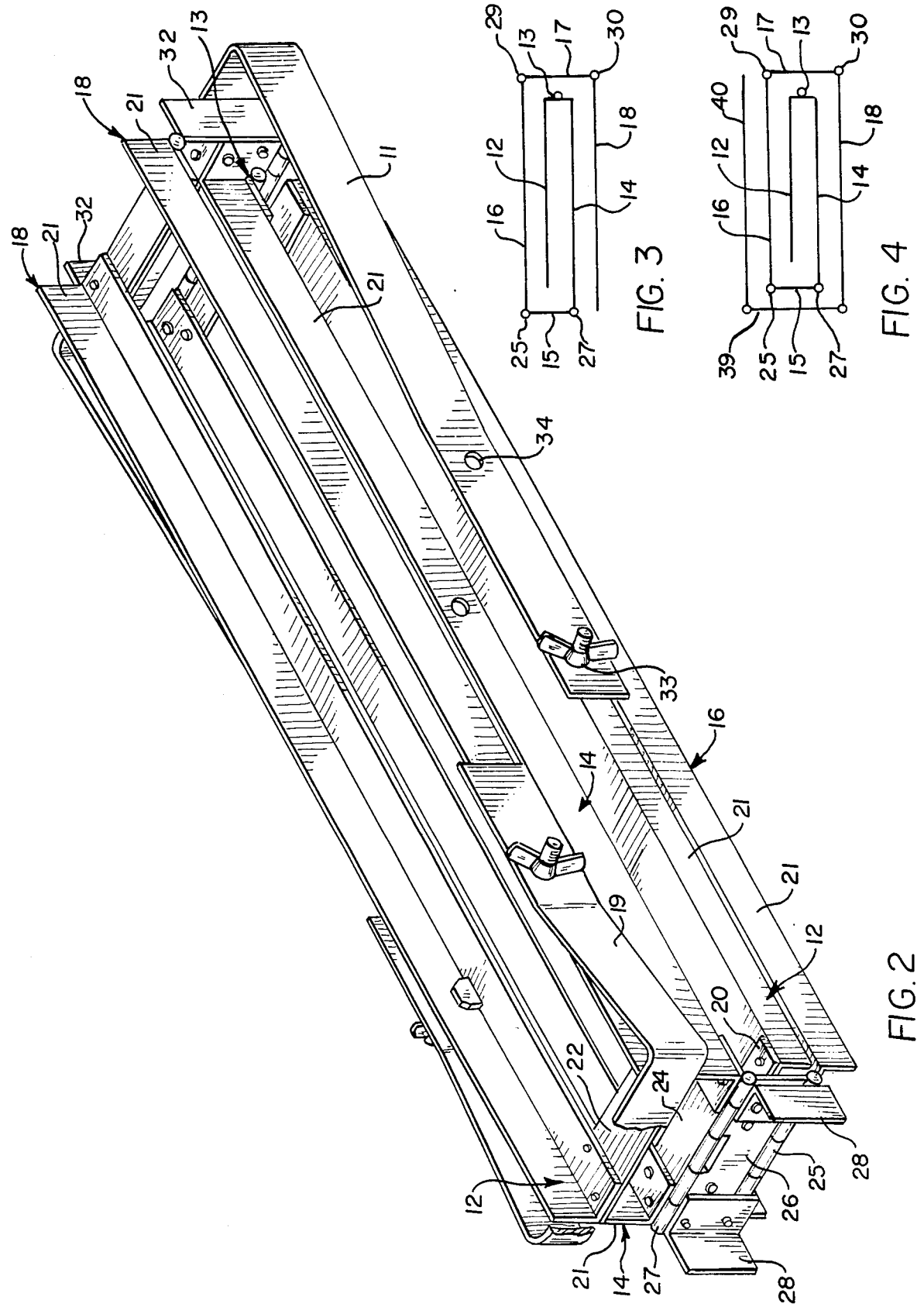

FOLDABLE DRAIN HOSE SUPPORT

This invention relates to a supporting trestle for flexible drain and sewage hose conduit. It is more particularly concerned with such a trestle that is easily set up and taken down and which can be folded into a compact package.

BACKGROUND OF THE INVENTION

Motor homes, mobile homes and similar recreational vehicles require connection to sewers as well as other utilities in trailer parks and camp sites. Flexible extensible hose of 3 or 4 inches in diameter is commonly used for that purpose in lengths extending up to perhaps 20 feet as it is easy to handle and can be collapsed into a relatively small package for storing. Flexible hose however accommodates itself to the terrain and often requires support at various points if flow is to be maintained. A variety of fabricated devices has been proposed for that purpose. A prime requisite for such a support device is that it be folded or collapsed into a compact package which can be accommodated in the limited storage space of a recreational vehicle.

SUMMARY OF THE INVENTION

My invention comprises a number of stretcher sections preferably made of angle members hinged together end-to-end with folding ground support elements at each end to make a trestle on which the drain hose rests. The stretcher sections, which preferably are four in number, are of approximately but not all the same lengths. When the trestle is taken down the sections are folded at the hinges against each other. The first and second sections are folded together. The hinge sections connecting the second and third sections are dimensioned so that the second and third sections fold parallel to each other but spaced apart to enclose the first section. The hinge section connecting the third and fourth stretcher sections is dimensioned so that those two sections fold parallel to each other but spaced apart sufficiently to enclose the folded first and second sections. My trestle thus folds into a compact form for storage.

BRIEF DESCRIPTION OF DRAWINGS

FIG. 2 is an isometric view of the trestle of FIG. 1 in folded condition.

FIG. 3 is a diagrammatic elevation of the stretcher sections and hinged members of the trestle of FIG. 1 in their folded positions.

FIG. 4 is a diagrammatic elevation of the stretcher sections and hinged members of a second embodiment of my invention in their folded position.

DESCRIPTION OF PREFERRED EMBODIMENTS

Figure 1:
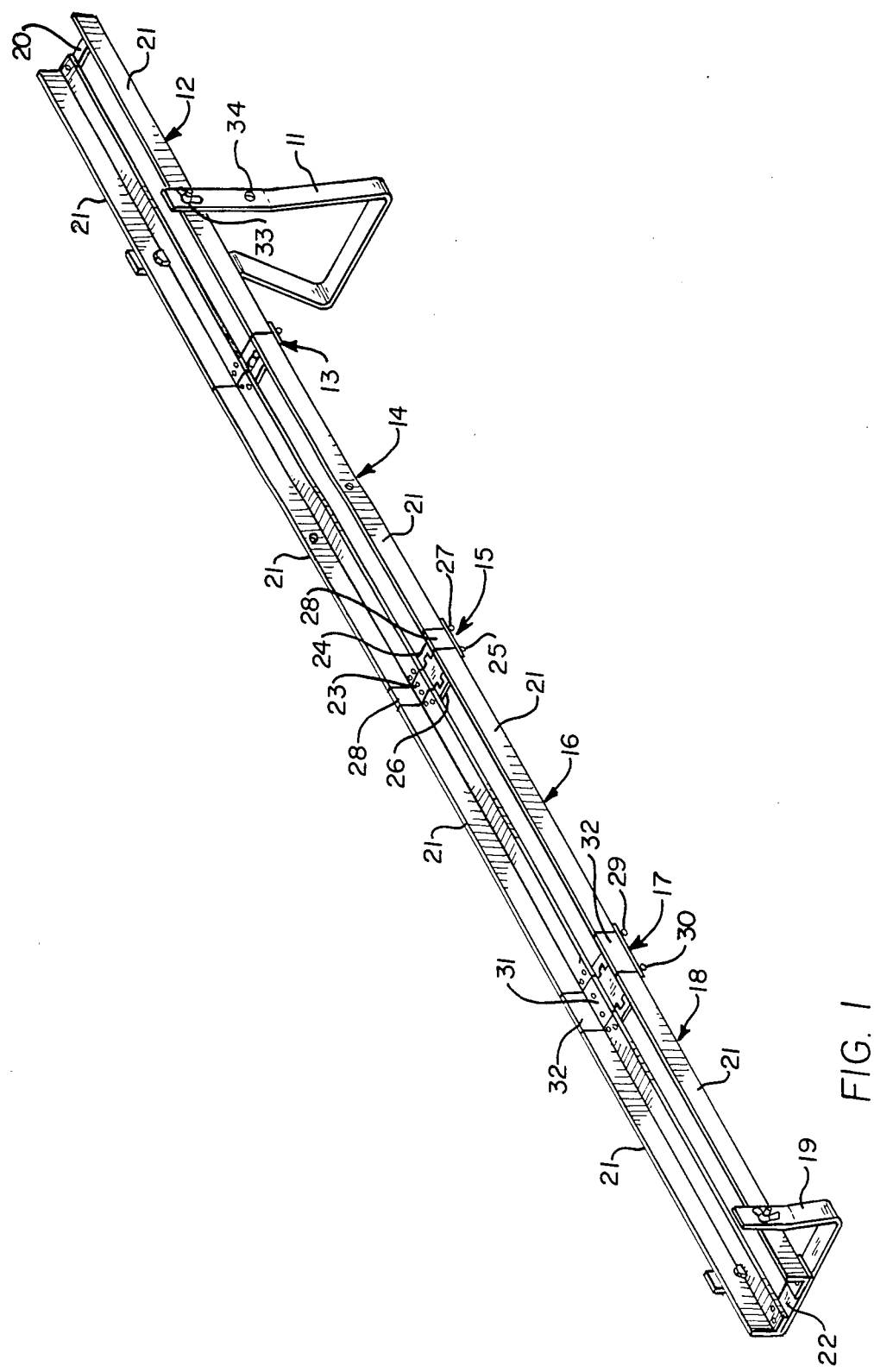
FIG. 1 is an isometric view of an embodiment of my trestle extended in working position to carry a flexible drain conduit.

A presently preferred embodiment of my invention best illustrated in FIG. 1 comprises four stretcher sections 12, 14, 16 and 18 connected end-to-end by three hinge sections 13, 15 and 17 respectively and two ground support elements 11 and 19 pivotally attached to stretcher sections 12 and 18 respectively. The stretcher sections are preferably of approximately the same length, although as will appear, not of exactly the same length. The stretcher sections are all of the same general construction comprising a pair of parallel elongated angle members 21-21 as shown for stretcher member 14 in FIG. 1 spaced apart so as to form a channel in which the drain conduit may lie. The angle members 21-21 are spaced apart by the hinge sections at each end, such as hinges 13 and 15 for stretcher member 14. A cross member 20 is affixed at the open end of stretcher section 12 and another cross member 22 at the open end of stretcher 18 to provide adequate spacing and rigidity to said sections. Ground support elements 11 and 19 have a series of openings 33 and 34 respectively which makes them adjustable and permits varying the height and gradient of the trestle in use.

Hinge 13 which connects stretcher sections 12 and 14 is a conventional single pin hinge. It will be observed from FIG. 1 that the ends of angle members 21 are cut off square and the same is true for all the other angle members of my trestle. When hinge 13 is open as is shown in FIG. 1 the square ends of the angle members 21 of stretcher section 14 abut against the square ends of the angle members of stretcher section 12, thus aligning stretcher sections 12 and 14. The other stretcher sections are aligned in the same way. Hinge 15 is a double-pin hinge having a flat bed plate 23 which is positioned crosswise of my trestle with side plates 24 and 26 also positioned crosswise of my trestle affixed to the adjoining stretcher sections respectively and pivoted to bed plate 23 around hinge pins 25 and 27 respectively. Bed plate 23 has upstanding flanges 28-28 at each end of a height equal to the flange height of angle members 21. The spacing between hinge pins 25 and 27 is enough so that when stretcher sections 14 and 16 are folded parallel to each other there is room between them for folded stretcher section 12. Hinge 17 connecting stretcher sections 16 and 18 is also a double-pin hinge of the same construction as hinge 15 except that the spacing between its two hinge pins is large enough to accommodate folded stretcher sections 12 and 14 when stretcher sections 16 and 18 are folded parallel to each other.

My trestle is converted into a small package for storage by folding the stretcher sections against each other around the pins of their connecting hinges. The folded package is shown in FIG. 2 but it will be best understood by reference to inverted diagrammatic FIG. 3 which for simplicity does not show ground support elements 11 and 19. End stretcher section 12 is folded back-to-back against adjoining stretcher section 14 around the single pin of hinge 13. Plate 23 of hinge 15 is then folded downwardly through 90 degrees around pin 25 of that hinge. Stretcher section 16 is then folded upwardly parallel and adjacent to stretcher section 12 around pin 27 of hinge 15. As has been mentioned plate 23 is dimensioned so as to permit the folding of stretcher section 16 so as to envelope stretcher section 12. Flat bed plate 31 of hinge 17 is then folded upwardly 90 degrees around its pin 29 adjoining stretcher section 16 and stretcher section 18 is then folded parallel against stretcher section 14 around the pin 30 of hinge 17. Bed plate 31 also has at each end upstanding flanges 32-32 of a height equal to the flange height of angle members 21.

From the above description it will be seen that the lengths of the various stretcher sections must be chosen so that they can fold together in the way mentioned. Stretcher section 14 must be longer than stretcher section 12. Stretcher section 16 must be longer that stretcher section 14. Ground support elements 11 and 19 are foldable into parallel alignment with their respective stretcher sections to which they are pivoted, as shown in FIG. 2.

I have found that a trestle of adequate length for most purposes requires only four stretcher sections; however my invention is not limited to a trestle of only four sections. FIG. 4 similar to FIG. 3 illustrates diagrammatically a trestle according to my invention of five stretcher sections in its folded condition. Stretcher sections 12 through 18 and hinges 13 through 17 are the same as has been described hereinabove. Stretcher section 18 is connected at its terminal end with fifth stretcher section 40 by two-pin hinge 39 which has its pins spaced apart sufficiently to allow folded members 12, 14 and 16 to be included between folded members 18 and 40.

While I have shown and described a present preferred embodiment of the invention and have illustrated a present preferred method of practicing the same, it is to be distinctly understood that the invention is not limited thereto but may be otherwise variously embodied within the scope of the following claims.

I claim:

1. A foldable support trestle for flexible fluid conduit comprising a series of at least four stretcher sections connected end-to-end by first, second and third hinge sections respectively, the first stretcher section being connected to the second stretcher section by the first hinge section so that the first and second stretcher sections can be folded against each other, the second stretcher section being connected to the third stretcher section by the second hinge section, said second hinge section being a double pin hinge section with an additional stretcher section between said pins so that the second and third stretcher sections can be folded parallel to each other but separated sufficiently to admit the first stretcher section between them, the third stretcher section being connected to the fourth stretcher section by the third hinge section, said third hinge section being a double pin hinge section with an addition stretcher section between said pins so that the third and fourth stretcher sections can be folded parallel to each other but separated sufficiently to admit the folded first and second stretcher sections between them.

2. The trestle of claim 1 including a first ground support element pivotally attached to said first stretcher section so that it can be folded to parallel said first stretcher section.

3. The trestle of claim 2 including a second ground support element pivotally connected to said fourth stretcher section so that it can be folded to parallel said fourth stretcher section.

4. The trestle of claim 1 including a fifth stretcher section connected to the fourth stretcher section by a fourth hinge section so that the fourth and fifth stretcher sections can be folded parallel to each other but separated sufficiently to admit the folded first, second and third stretcher sections between them.

5. The trestle of claim 2 or 3 including means to adjust the height of said ground support elements.

* * * * *